US012715107B2

(12) United States Patent
Sun

(10) Patent No.: US 12,715,107 B2
(45) Date of Patent: Aug. 25, 2026

(54) ROBOTIC ARM, SLAVE OPERATING DEVICE, AND SURGICAL ROBOT

(71) Applicant: SHENZHEN EDGE MEDICAL CO., LTD., Shenzhen (CN)

(72) Inventor: Qiang Sun, Shenzhen (CN)

(73) Assignee: SHENZHEN EDGE MEDICAL CO., LTD., Shenzhen (CN)

(*) Notice: Subject to any disclaimer, the term of this patent is extended or adjusted under 35 U.S.C. 154(b) by 294 days.

(21) Appl. No.: 18/708,014

(22) PCT Filed: Nov. 2, 2022

(86) PCT No.: PCT/CN2022/129289
§ 371 (c)(1),
(2) Date: May 7, 2024

(87) PCT Pub. No.: WO2023/083078
PCT Pub. Date: May 19, 2023

(65) Prior Publication Data

US 2026/0158640 A1 Jun. 11, 2026

(30) Foreign Application Priority Data

Nov. 11, 2021 (CN) ........................ 202111334168.2

(51) Int. Cl.
*B25J 3/00* (2006.01)

(52) U.S. Cl.
CPC ...................................... *B25J 3/00* (2013.01)

(58) Field of Classification Search
CPC . A61B 34/30; A61B 34/70; A61B 2017/2939; A61B 2090/506; B25J 9/1065; B25J 3/00
See application file for complete search history.

(56) References Cited

U.S. PATENT DOCUMENTS 9,339,344 B2 * 5/2016 Schena .................. A61B 34/30
2013/0325032 A1 * 12/2013 Schena .................. A61B 34/30
606/130

(Continued)

FOREIGN PATENT DOCUMENTS

CN 104334112 A 2/2015
CN 105338920 A 2/2016

(Continued)

OTHER PUBLICATIONS

International Search Report of PCT Patent Application No. PCT/CN2022/129289 issued on Jan. 18, 2023.

*Primary Examiner* — Zakaria Elahmadi

(57) ABSTRACT

A robotic arm, including: an adjustment arm, in connection with the orientation platform and including a plurality of joints; a cyclone joint, in connection with the adjustment arm, with an axis passing through the cyclone joint not passing through an RC point; a deflection joint, in connection with the cyclone joint, with an axis passing through the deflection joint as well as passing through the RC point; a parallelogram mechanism, in connection with the deflection joint and configured to move a surgical instrument around the RC point; and an instrument carrying arm, in connection with the parallelogram mechanism and configured to install the surgical instrument. In a state where the cyclone joint is actuated, at least three joints of the adjustment arm are linked to maintain a position of the RC point in a reference coordinate system of the orientation platform constant.

20 Claims, 15 Drawing Sheets

(56) References Cited

U.S. PATENT DOCUMENTS

| | | | | |
|---|---|---|---|---|
| 2015/0257840 | A1* | 9/2015 | Mohr | A61B 34/37 606/130 |
| 2019/0231460 | A1 | 8/2019 | DiMaio et al. | |
| 2021/0267699 | A1 | 9/2021 | Griffiths et al. | |

FOREIGN PATENT DOCUMENTS

| | | | | | |
|---|---|---|---|---|---|
| CN | 105748153 | A | * | 7/2016 | B25J 9/12 |
| CN | 106102633 | A | * | 11/2016 | B25J 9/1689 |
| CN | 106132345 | A | | 11/2016 | |
| CN | 106584445 | A | | 4/2017 | |
| CN | 106687062 | A | * | 5/2017 | G05B 19/02 |
| CN | 208598522 | U | | 3/2019 | |
| CN | 109998685 | A | | 7/2019 | |
| CN | 111481291 | A | | 8/2020 | |
| CN | 112245011 | A | | 1/2021 | |
| CN | 112315585 | A | | 2/2021 | |
| CN | 112971990 | A | | 6/2021 | |
| CN | 113334393 | A | | 9/2021 | |
| CN | 114098958 | A | | 3/2022 | |
| CN | 114129266 | A | | 3/2022 | |
| EP | 2537483 | A2 | | 12/2012 | |
| WO | 2013181522 | A1 | | 12/2013 | |
| WO | 2019240453 | A1 | | 12/2019 | |

* cited by examiner

ROBOTIC ARM, SLAVE OPERATING DEVICE, AND SURGICAL ROBOT

CROSS-REFERENCE TO RELATED APPLICATIONS

The present application is the U.S. national phase of International Application No. PCT/CN2022/129289 with an international filing date of Nov. 2, 2022, designating the U.S., now pending, and claims the priority of the Chinese patent application with the application No. 202111334168.2 and the application title "ROBOTIC ARM, SLAVE OPERATING DEVICE, AND SURGICAL ROBOT" filed with the CNIPA on Nov. 11, 2021, the entire contents of which are incorporated herein by reference.

TECHNICAL FIELD

The present application relates to the technical field of medical devices, more particularly to a robotic arm, a slave operating device, and a surgical robot.

BACKGROUND

Minimally invasive surgery refers to a surgical method that uses modern medical instruments such as a laparoscopy and a thoracoscopy and related instruments to perform surgery inside a human cavity. Compared with traditional surgical methods, minimally invasive surgery has the advantages of smaller trauma, fewer pain, and faster recovery.

With the development of science and technology, robotic technology for minimally invasive surgery has been gradually matured and widely used. A minimally invasive surgical robot usually includes a master operating console and a slave operating device. The master operating console is configured to send control commands to the slave operating device according to the doctor's operation to control the slave operating device. The slave operating device is configured to perform corresponding surgical operations in response to the control commands sent by the master operating console. A surgical instrument is in connection with a driving device of the slave operating device for performing a surgical operation, and the surgical instrument has a long shaft and an end effector located at an end of the long shaft. Theoretically, in the process of the surgery, a point of contact between the long shaft of the surgical instrument and the minimally invasive incision on the patient should remain stationary to avoid tearing of the patient's wound.

However, the existing technology cannot ensure that such point of contact remains stationary at the patient's minimally invasive incision.

SUMMARY

A main object of the present application is to provide a robotic arm, a slave operating device, and a surgical robot, which aim at realizing that a point of contact between a long shaft of a surgical instrument and a minimally invasive incision on a patient remains stationary so as to avoid tearing of the patient's wound.

In order to achieve the above object, the present application provides a robotic arm, which is installed on an orientation platform. The robotic arm comprises:

an adjustment arm, which is in connection with the orientation platform and comprises a plurality of joints;

a cyclone joint, which is in connection with the adjustment arm, with an axis passing through the cyclone joint being defined as a cyclone axis, and the cyclone axis not passing through a remote center of manipulation (RC point);

a deflection joint, which is in connection with the cyclone joint, with an axis passing through the deflection joint being defined as a deflection axis, and the deflection axis passing through the RC point;

a parallelogram mechanism, which is in connection with the deflection joint and configured to move a surgical instrument around the RC point; and an instrument carrying arm, which is in connection with the parallelogram mechanism and configured to install the surgical instrument.

In a state where the cyclone joint is actuated, at least three joints of the adjustment arm are linked to maintain a position of the RC point in a reference coordinate system of the orientation platform constant.

Optionally, the plurality of joints comprise: a first joint, a second joint, a third joint, and a fourth joint connected in sequence: the first joint is in connection with the orientation platform; and the fourth joint is in connection with the cyclone joint.

Optionally, the first joint and the fourth joint are rotary joints, and the second joint and the third joint are linear joints.

In the state where the cyclone joint is actuated, the first joint, the second joint, the third joint, and the fourth joint are linked to maintain the position of the RC point in the reference coordinate system constant.

Optionally, the first joint and the fourth joint are rotary joints, and the second joint and the third joint are linear joints.

In the state where the cyclone joint is actuated, the second joint, the third joint, and the fourth joint are linked to maintain the position of the RC point in the reference coordinate system constant.

Optionally, the first joint is a rotary joint, and the second joint, the third joint, and the fourth joint are linear joints. In the state where the cyclone joint is actuated, the first joint, the second joint, the third joint, and the fourth joint are linked to maintain the position of the RC point in the reference coordinate system constant.

Optionally, the first joint is a rotary joint, and the second joint, the third joint, and the fourth joint are linear joints. In the state where the cyclone joint is actuated, the second joint, the third joint, and the fourth joint are linked to maintain the position of the RC point in the reference coordinate system constant.

Optionally, the first joint and the second joint are rotary joints, and the third joint and the fourth joint are linear joints.

In the state where the cyclone joint is actuated, the first joint, the second joint, the third joint, and the fourth joint are linked to maintain the position of the RC point in the reference coordinate system constant.

Optionally, the first joint and the second joint are rotary joints, and the third joint and the fourth joint are linear joints.

In the state where the cyclone joint is actuated, the second joint, the third joint, and the fourth joint are linked to maintain the position of the RC point in the reference coordinate system constant.

Optionally, the first joint, the second joint, and the fourth joint are rotary joints, and the third joint is a linear joint.

In the state where the cyclone joint is actuated, the first joint, the second joint, the third joint, and the fourth joint are linked to maintain the position of the RC point in the reference coordinate system constant.

Optionally, the first joint, the second joint, and the fourth joint are rotary joints, and the third joint is a linear joint.

In the state where the cyclone joint is actuated, the second joint, the third joint, and the fourth joint are linked to maintain the position of the RC point in the reference coordinate system constant.

In order to achieve the above object, the present application further provides a slave operating device. The slave operating device comprises an orientation platform. The slave operating device comprises the robotic arm as described in the above, and the robotic arm is in connection with the orientation platform.

In order to achieve the above object, the present application further provides a surgical robot. The surgical robot comprises: the slave operating device as described in the above; and a master operating console, configured to control the slave operating device.

In the robotic arm, the slave operating device, and the surgical machine provided by the present application, the deflection axis passes through the remote center RC point, the cyclone axis does not pass through the RC point, and the adjustment arm includes plurality of joints, such that when the cyclone joint is actuated, the position of the RC point in the reference coordinate system of the orientation platform is maintained constant, by adopting the linkage of at least three joints of the adjustment arm. In this way, a point of contact between a long shaft of a surgical instrument and a minimally invasive incision on a patient remains stationary so as to avoid tearing of the patient's wound.

DETAILED DESCRIPTION OF THE DRAWINGS

The realization, functional features, and advantages of the present application will be further described with reference to the accompanying drawings in conjunction with the embodiments.

DETAILED DESCRIPTION OF THE EMBODIMENTS

The following will clearly and completely explain the technical solutions in the embodiments of the present application with reference to the accompanying drawings in the embodiments of the present application. Obviously, the described embodiments are only part of, rather than all of, the embodiments of the present application. Based on the embodiments in the present application, all other embodiments obtained by those skills in the art, without paying creative efforts, fall within the protection scope of the present application.

It should be noted that all directional indications (such as upper, lower, left, right, front, rear, etc.) in embodiments of the present application are only used to explain the relative positional relationship, movement conditions, etc. among components in a particular posture (as shown in the figures). If the specific posture changes, the directional indication may also change accordingly.

In the present application, unless otherwise clearly specified and limited, the terms "connection" and "fixation" should be interpreted in a broad sense, for example, "fixation" can be a fixed connection, a detachable connection, or integrated as a whole, can be a mechanical connection or an electrical connection; can be a direct connection or an indirect connection through an intermediate medium, and can be an internal communication between two elements or an interaction relationship between two elements, unless otherwise clearly defined. The specific meanings of the above terms in present application can be understood by those skilled in the art according to specific situations.

In addition, descriptions such as "first", "second" and the like in present application are only for description purposes, and should not be understood as indicating or implying their relative importance or implicitly indicating the number of indicated technical features. Thus, the features defined as "first" and "second" may explicitly or implicitly include at least one of these features. In addition, the technical solutions of the various embodiments can be combined with each other, on the premise that those skilled in the art are able to realize such combination of technical solutions. When the combination of technical solutions is contradictory or cannot be realized, it should be considered that the combination of technical solutions does not exist, nor is such combination of technical solutions within the scope of protection as claimed in the present application.

Figure 1:
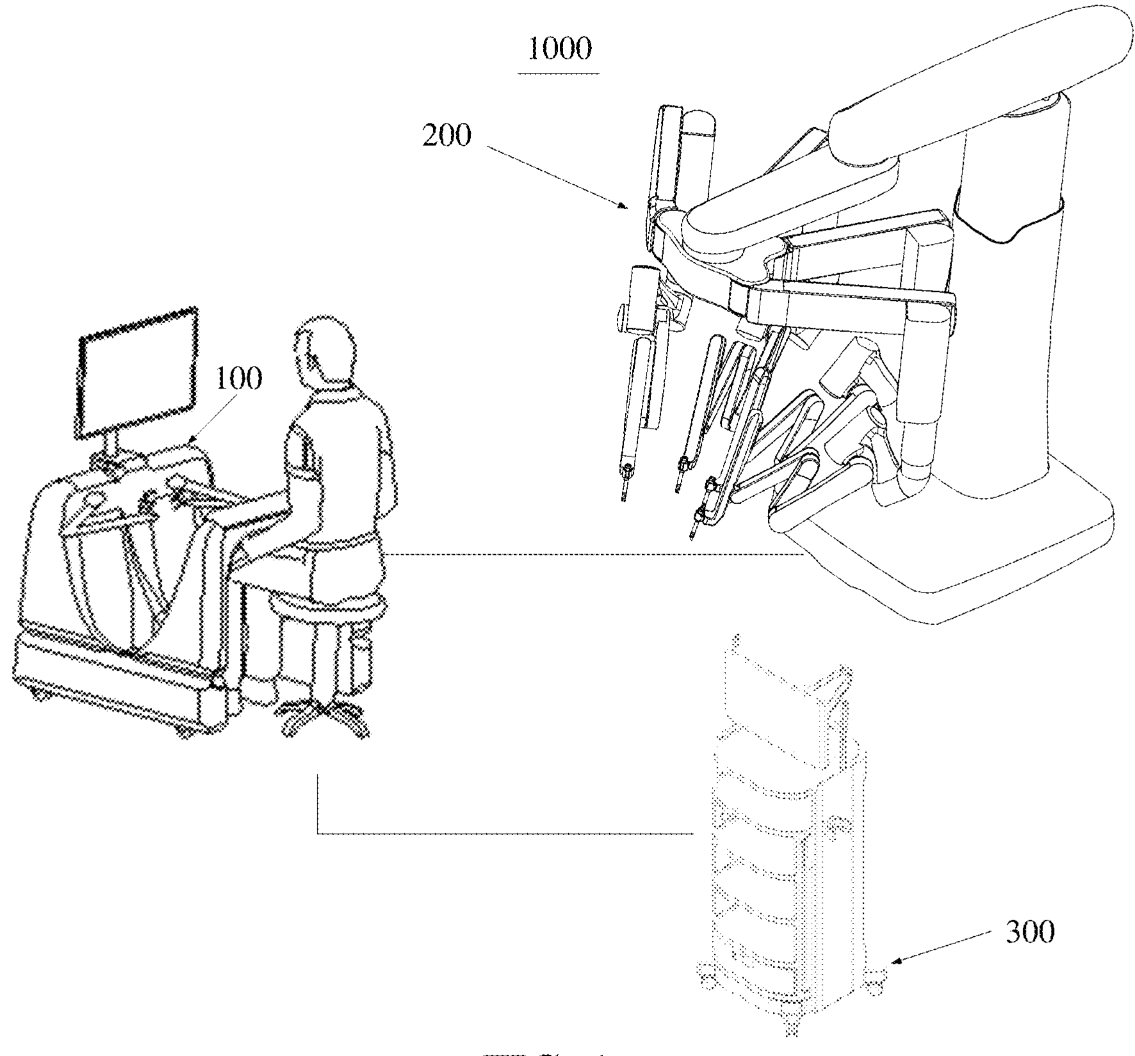
FIG. 1 is a schematic structural view of a surgical robot according to an embodiment of the present application.

As shown in FIG. 1, a surgical robot 1000 may be configured to perform minimally invasive diagnostic or surgical procedures on a patient lying flat on an operating table. The surgical robot 1000 includes a master operating console 100 and a slave operating device 200. The master operating console 100 is configured to send control commands to the slave operating device 200 according to the doctor's operation to control the slave operating device 200. The slave operating device 200 is configured to perform corresponding surgical operations in response to the control commands sent by the master operating console 100. The surgical robot may further include an electronic device trolley 300 electrically in connection with the master operating console 100. The surgeon can observe a surgical site through the master operating console 100, and the slave operating device 200 can manipulate at least one removably connected surgical instrument (not shown) through the minimally invasive incision on the patient. The image of the surgical site can be obtained by an endoscope (not shown in the figure), such as a stereoscopic endoscope, which can be manipulated by the slave operating device 200 to orient the endoscope. The electronic device trolley 300 may be configured to display an image of the surgical site, so as to display to a physician's assistant.

Figure 2:
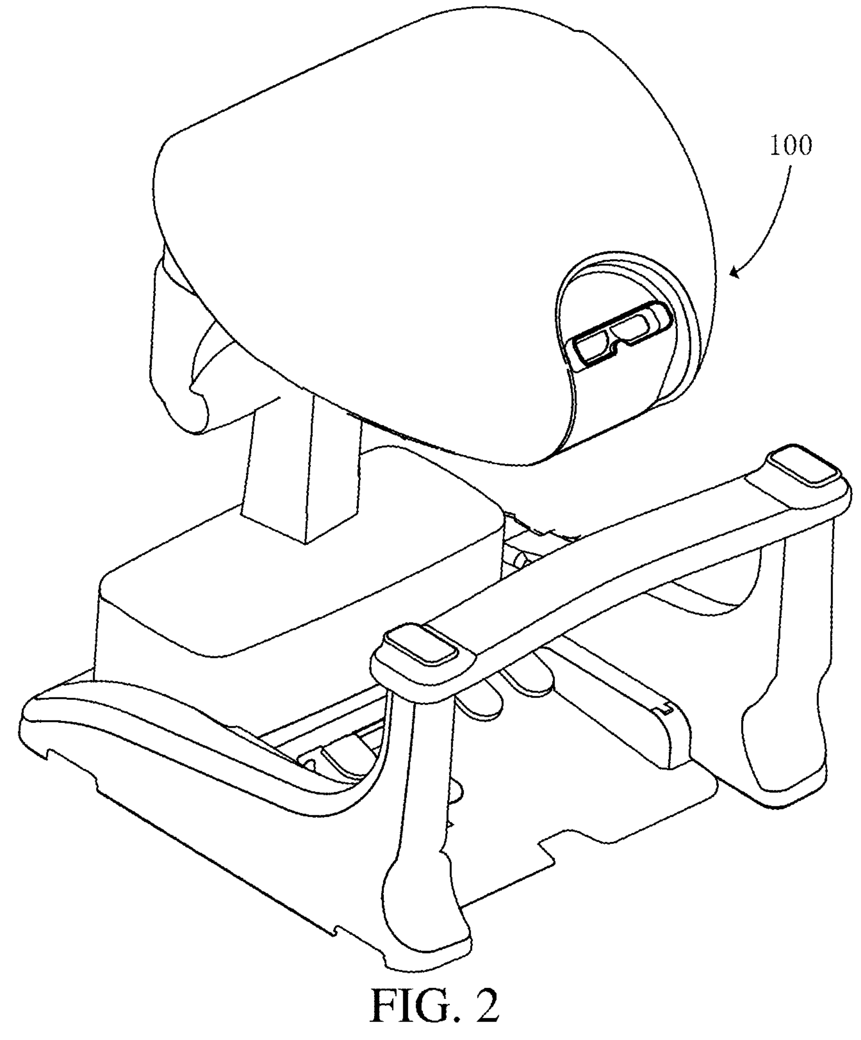
FIG. 2 is a schematic structural view of a master operating console in FIG. 1 according to an embodiment of the present application.

FIG. 2 is a schematic diagram of a master operating console 100 for a surgeon. The master operating console 100 for the surgeon includes: a left-eye display and a right-eye display (not shown in the figure), which are configured to present to the surgeon a stereoscopic view capable of depth perception of the surgical site. The master operating console 100 further includes one or more input control devices (not shown in the figure), and the surgeon operates the input control devices to make the slave operating device 100 manipulate one or more surgical instruments synchronously. The input control device can provide the same degrees of freedom as the surgical instruments associated therewith, thereby providing the surgeon with telepresence, or provide the perception that the input control device is integrated with the surgical instruments, so that the surgeon has a strong sense of direct control of the surgical instruments.

Figure 3:
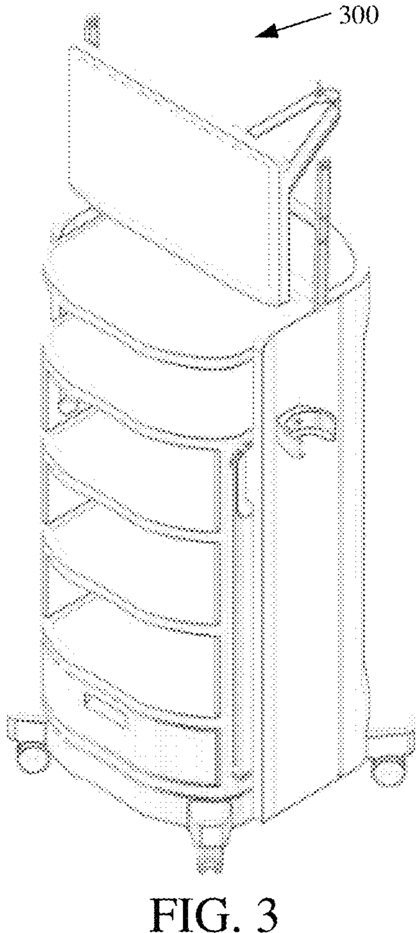
FIG. 3 is a schematic structural view of an electronic device trolley in FIG. 1 according to an embodiment of the present application.

FIG. 3 is a schematic diagram of an electronic device trolley 300. The electronic device trolley 300 can be in connection with the endoscope and may include a processor for processing the captured image, and the captured image is used to be displayed to the surgeon at the surgeon's console or at another suitable computer located locally and/or remotely. For example, in the case of a stereoscopic endoscope, an image host in the electronic device trolley 300 may process the captured image to present a coordinated stereoscopic image of the surgical site to the surgeon. Such coordination may include alignment between opposing images, and may include adjusting the stereoscopic working distance of the stereoscopic endoscope. As another example, image processing may include using predetermined camera calibration parameters to compensate for imaging errors of the image capture device, such as optical aberrations.

Figure 4:
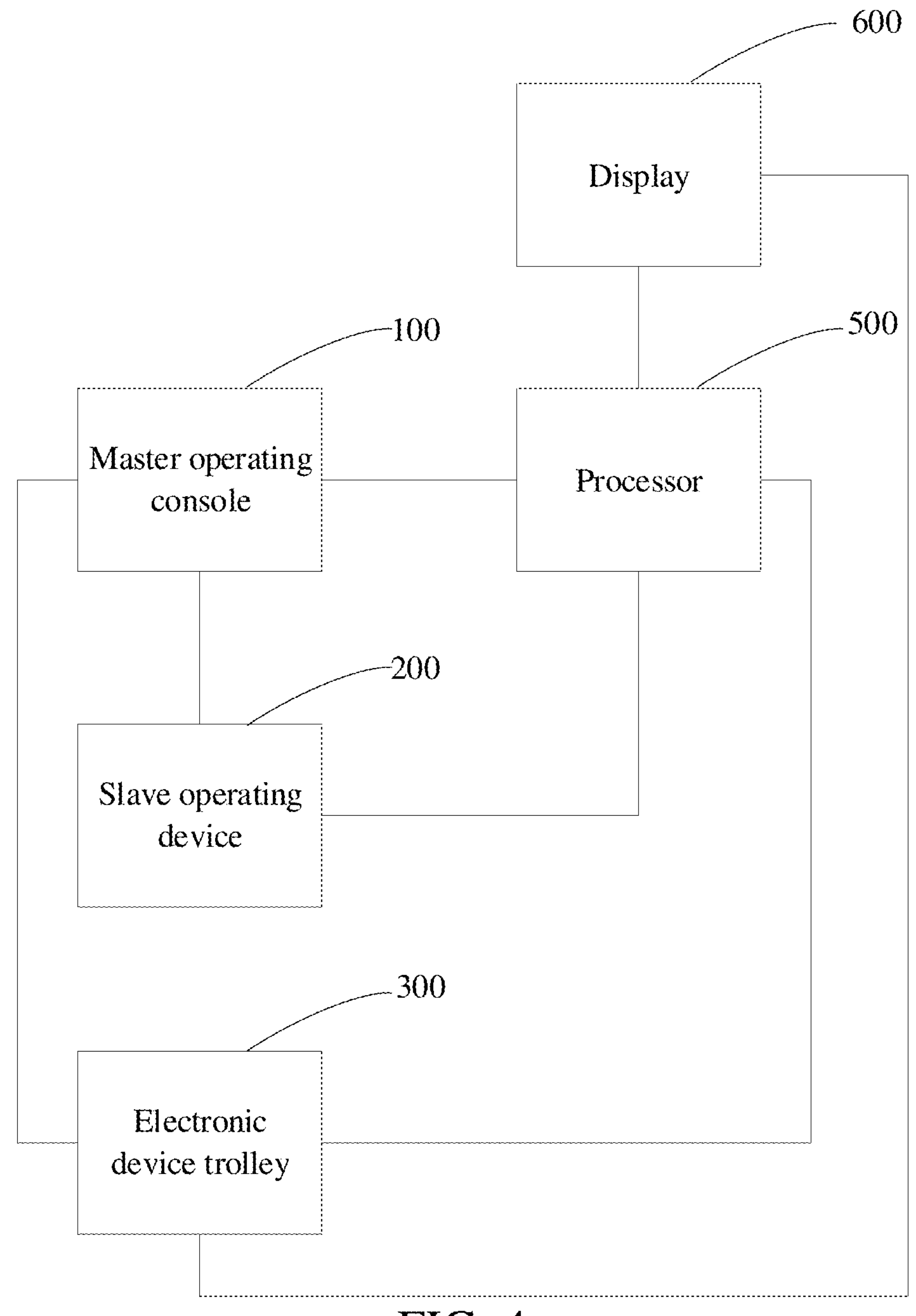
FIG. 4 is a block schematic structural diagram of FIG. 1.

As shown in FIG. 4, the master operating console 100 for the surgeon may be used by the surgeon to control the slave operating device 200 during minimally invasive surgery. The slave operating device 200 may capture an image of a surgical site using an imaging device such as a stereoscopic endoscope and output the captured image to the master operating console 100 and the electronic device trolley 300. As discussed in the above, the electronic device trolley 300 is able to process the captured image in various ways prior to any subsequent display. For example, the electronic device trolley 300 may overlay the captured image with a virtual control interface before displaying the combined image to the surgeon via the surgeon's master operating console 100. The captured image may be output from the slave operating device 200 for processing outside the electronic device trolley 300. For example, the captured image can be output from the slave operating device 200 to the processor 500, and the processor 500 may be configured to process the captured image. The image may also be processed by a combination of the electronic device trolley 300 and the processor 500, and the electronic device trolley 300 and the processor 500 may be coupled together for joint, sequential, and/or combined processing of the captured image. One or more separate displays 600 may also be coupled to the processor 500 and/or the electronic device trolley 300 for local and/or remote display of the image, such as an image of the surgical site or other relevant images. It can be understood that the processor may include a processor of the master operating console 100, a processor of the slave operating device 200, and a processor of the image host (not shown in the figure) on the electronic device trolley 300. For ease of understanding, only one processor is identified here.

Figure 5:
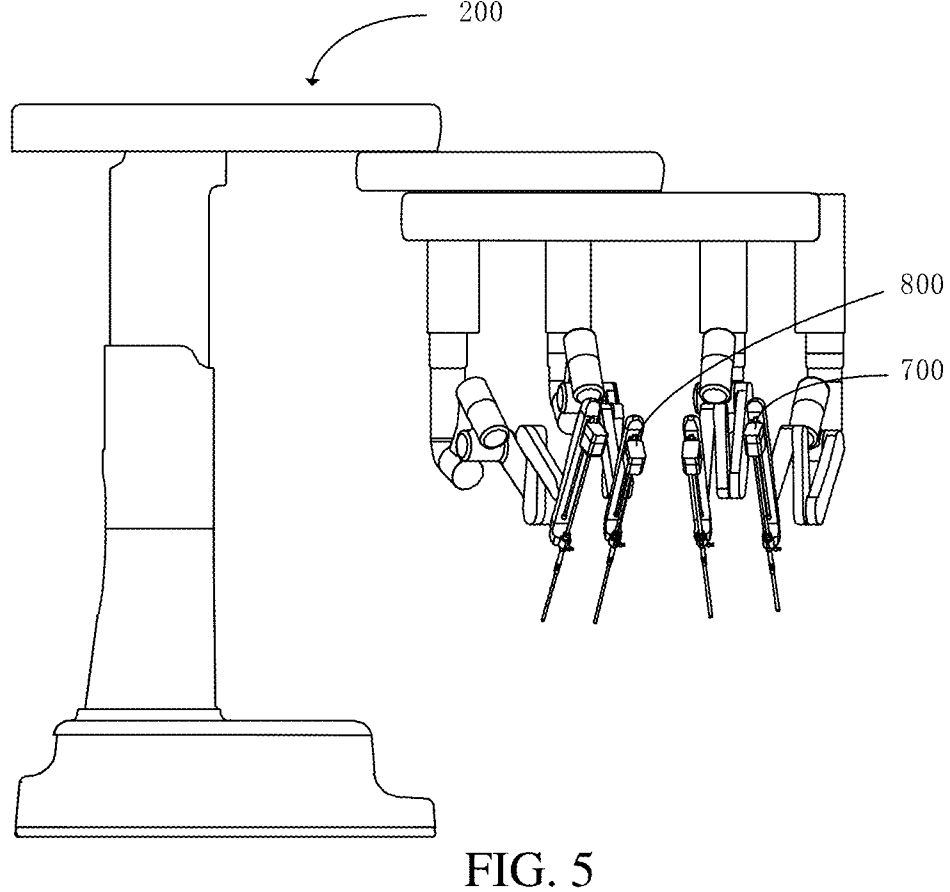
FIG. 5 is a simplified schematic structural view of a slave operating device in FIG. 1 according to an embodiment of the present application.

As shown in FIG. 5, the slave operating device 200 provides manipulation of three surgical instruments 700 and imaging devices 800, the imaging devices 800 may be such as stereoscopic endoscopes for capturing images of a surgical site. The imaging devices 800 and the surgical instruments 700 can be arranged and manipulated at the incision on the patient in such a manner that the kinematic RC point (remote center of manipulation) is maintained at the incision, thereby minimizing the size of the incision. The images of the surgical site may include images of distal ends of the surgical instruments 700 when the distal ends of the surgical instruments 700 are disposed within the field of views of the imaging devices 800.

Figures 6, 7:
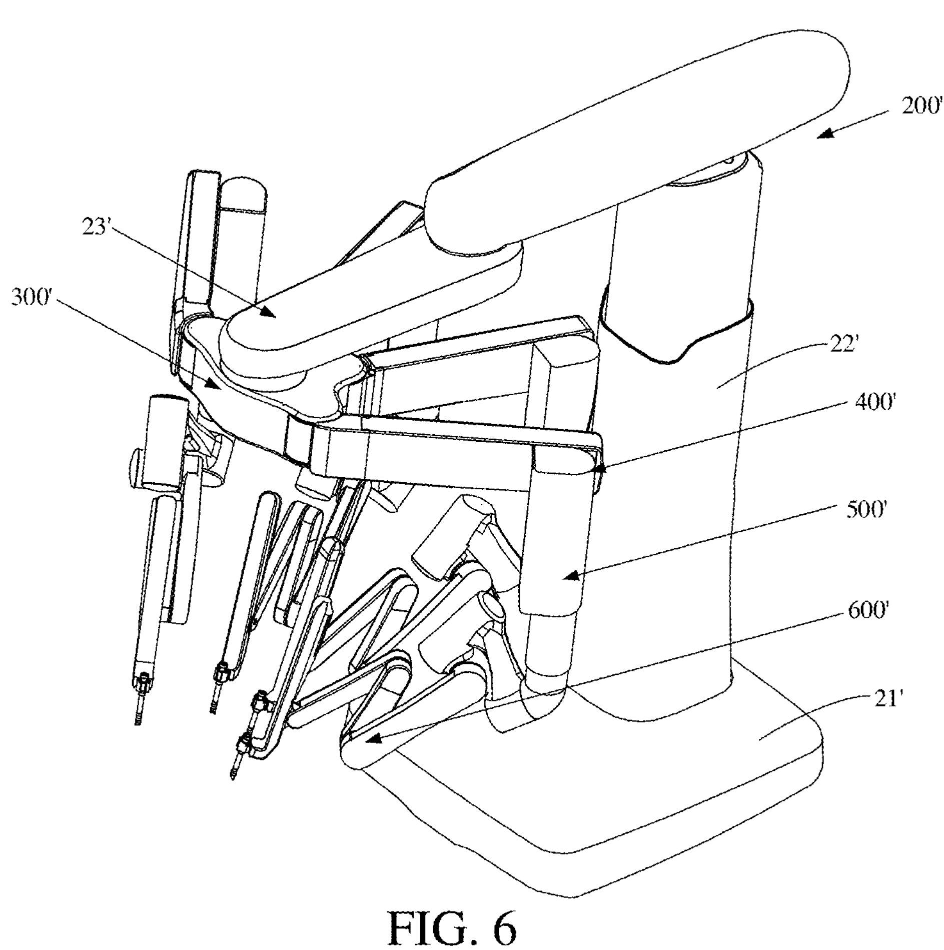
FIG. 6 is a simplified structural schematic view of a slave operating device in FIG. 1 according to another embodiment of the present application.
FIG. 7 is a simplified structural schematic view of a slave operating device according to an embodiment of the present application.

As shown in FIG. 6, the slave operating device 200 includes a base 200', an orientation platform 300' installed on the base 200', and a robotic arm 400' in connection with the orientation platform 300'. The base 200' may further include: a base body 21', a column 22' disposed on the base body 21', a suspension arm 23' in connection with the column 22', and the orientation platform 300' is in connection with the suspension arm 23'. The robotic arm 400' includes: an adjustment arm 500' in connection with the orientation platform 300', an operating arm 600' in connection with the adjustment arm 500', and a surgical instrument (not shown in the figure) installed on the operating arm. The surgical instrument may be an electric cauterizer, a clamp, a stapler, a scissor, etc., for performing surgical operations, and may also be a camera or other surgical instruments for acquiring images. Multiple surgical instruments are inserted into the body of the patient via different incisions.

Figure 8:
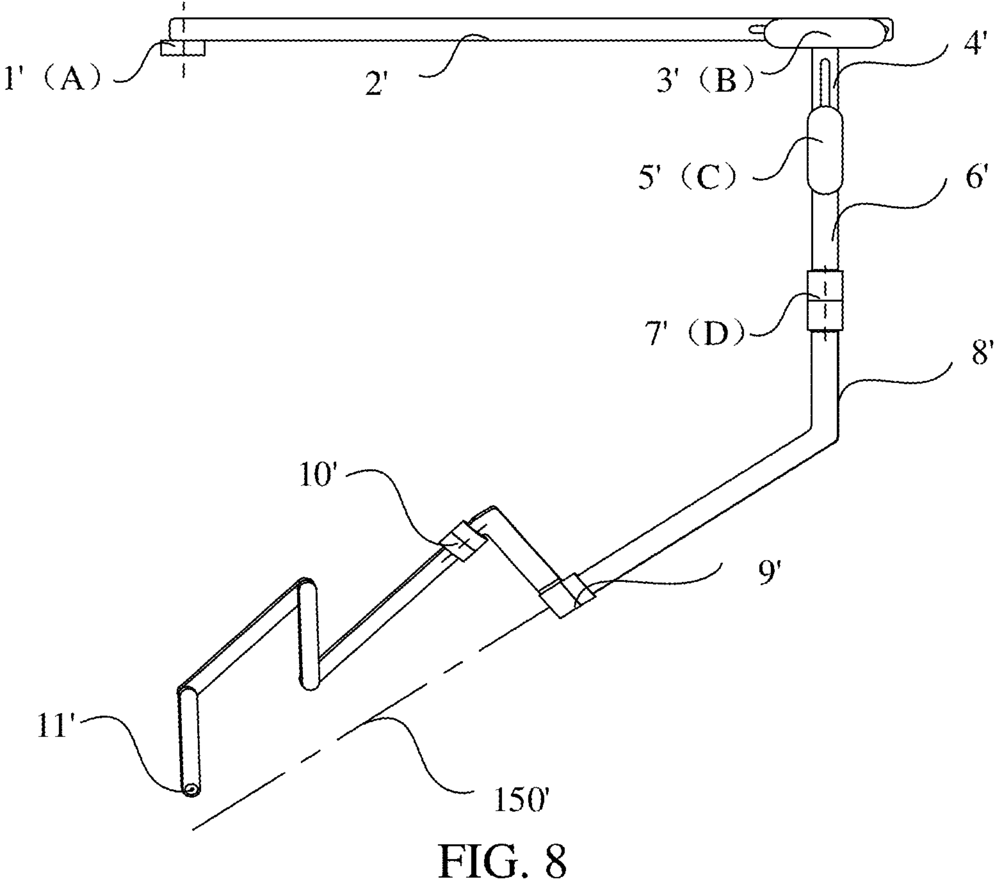
FIG. 8 is a simplified structural schematic view of a robotic arm according to an embodiment of the present application.

As shown in FIGS. 7-8, the orientation platform 124' is in connection with the suspension arm 122', the adjustment arm 126' is in connection with the orientation platform 124', the operating arm 130' is attached to the adjustment arm 126', and is supported by the adjustment arm 126'. The adjustment arm 126' may include: a rotary joint 1', a rotary arm 2', a linear joint 3', a translation arm 4', a linear joint 5', a lifting arm 6', a rotary joint 7', a rotary arm 8', a cyclone joint 9', a deflection joint 10'. The components of the adjustment arm 126' are connected in sequence.

The adjustment arm 126' is in rotatable connection with the orientation platform 124' through the rotary joint 1', and is supported by the orientation platform 124'. The orientation platform 124' is in rotatable connection with and supported by the suspension arm 122'. The suspension arm 122' is fixedly attached to and supported by the base body 72' via the column 88'. The suspension arm 122' is operable to selectively set the angle of the orientation platform 124' relative to the base 72'. The adjustment arm 126' is operable to selectively set the angle of the associated operating arm 130' relative to the orientation platform 124'.

The operating arm 130' further includes: a coupling link 20' fixedly connecting the deflection joint 10' to the cyclone joint 9', and a parallelogram mechanism 82' in connection with the deflection joint 10' and configured to move the surgical instrument around the RC point. The cyclone joint 9' is operable to rotate the deflection joint 10' relative to a support link 128' around a cyclone axis 150'. The cyclone axis 150' does not pass through the RC point. The deflection axis 140' passes through the RC point. Operation of the cyclone joint 9' can be configured to reorient the parallelogram mechanism 82' relative to the patient without moving the RC point relative to the patient.

As shown in FIGS. 7-8, the rotation of the rotary joint 1' drives the rotation of the rotary arm 2', the movement of the linear joint 3' drives the translation arm 4' so that the translation arm 4' can move in a horizontal direction, and the movement of the linear joint 5' drives the lifting arm 6' to enable the lifting arm 6' to move in a vertical direction, the rotation of the rotary joint 7' drives the rotary arm 8' to rotate, and the rotation of the cyclone joint 9 drives the parallelogram mechanism 82' to rotate around the cyclone axis 150'. The linear joint 3' and the linear joint 5' are linked, and the rotary joint 1', the rotary joint 7', and the cyclone joint 9' may rotate independently.

Figure 9:
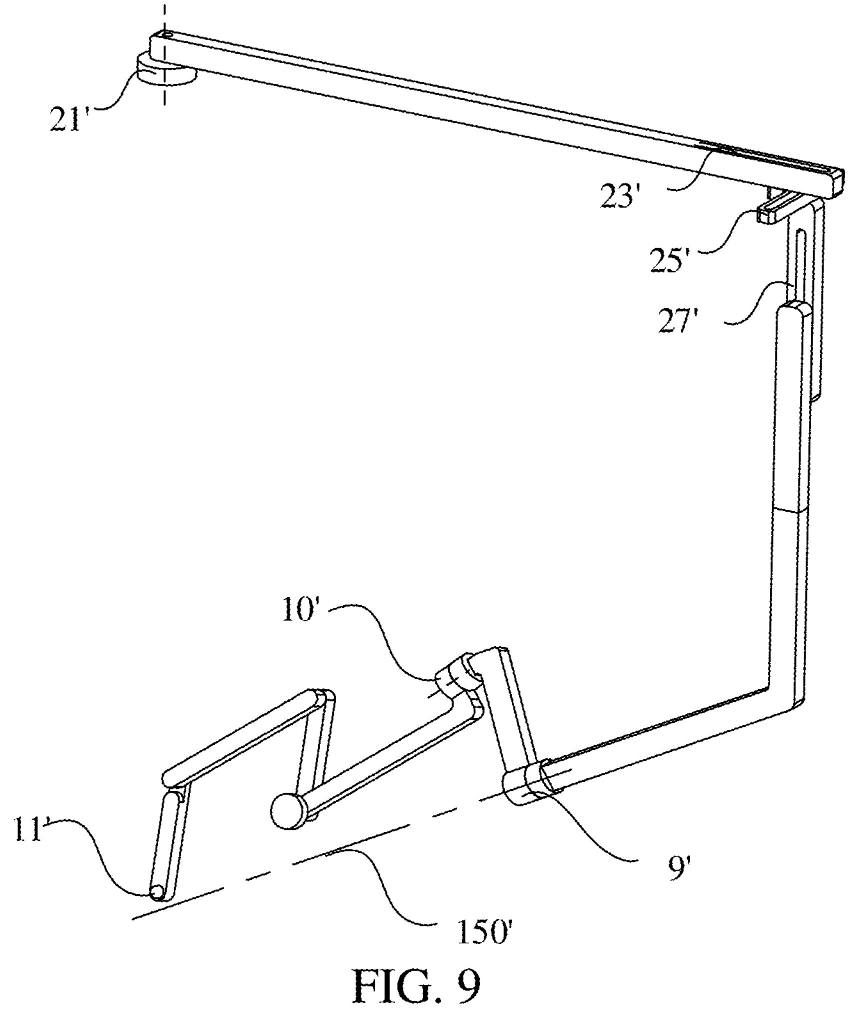
FIG. 9 is a simplified structural schematic view of a robotic arm according to another embodiment of the present application.

As shown in FIG. 9, relative to the embodiments shown in FIGS. 7-8, in another embodiment, the adjustment arm may include a rotary joint 21' and three linear joints 23', 25', and 27'. The rotary joint 21' is linked with the linear joints 23', 25', and 27', or alternatively, the linear joints 23', 25', and 27' are linked together, so as to maintain the position of the RC point in reference coordinate system of the orientation platform constant, in which, the translation directions of the three linear joints are perpendicular to each other.

Figure 10:
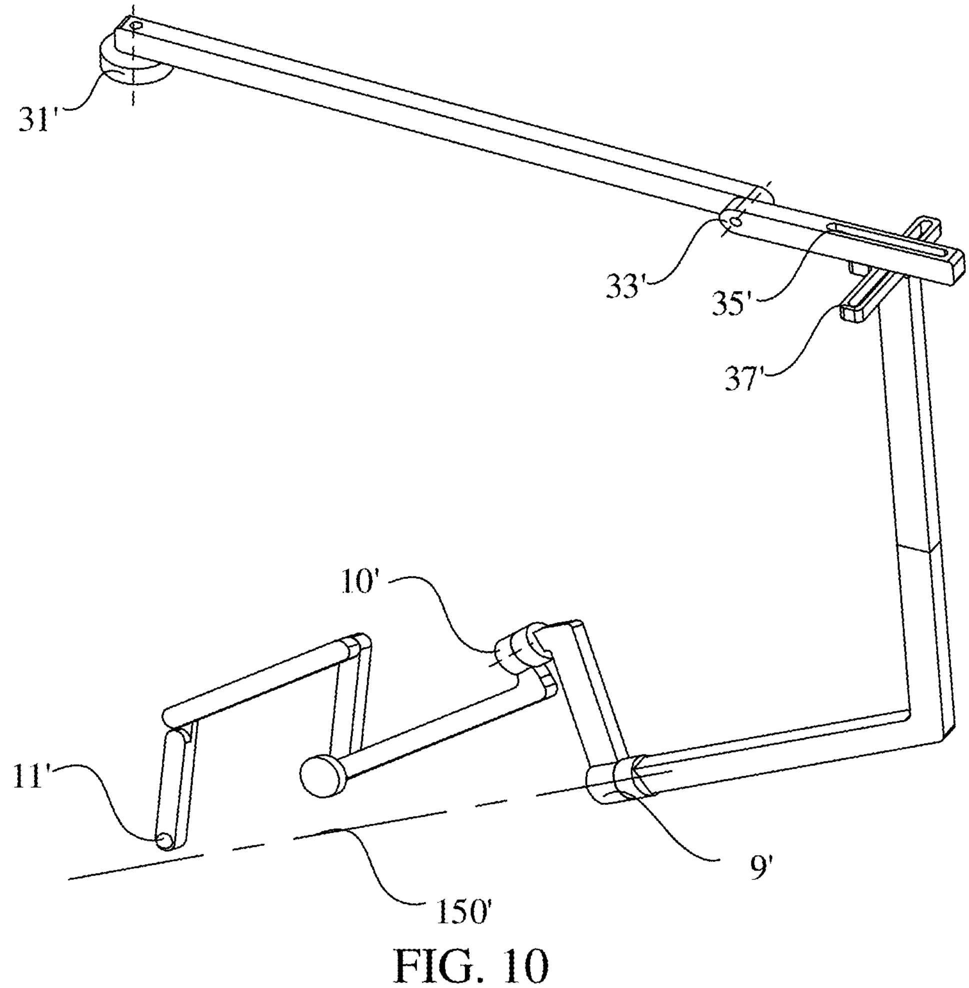
FIG. 10 is a simplified structural schematic view of a robotic arm according to still another embodiment of the present application.

As shown in FIG. 10, relative to the embodiments shown in FIGS. 7-8, in another embodiment, the adjustment arm may include two rotary joints 31', 33' and two linear joints 35', 37'. The rotary joint 31', the rotary joint 33', the linear joint 35', and the linear joint 37' are linked together, or alternatively, the rotary joint 33', the linear joint 35', and the linear joint 37' are linked together, so as to maintain the position of the RC point in the reference coordinate system of the orientation platform constant, in which, the rotation axes of the two rotary joints are perpendicular to each other, and the translation directions of the two linear joints are perpendicular.

Figure 11:
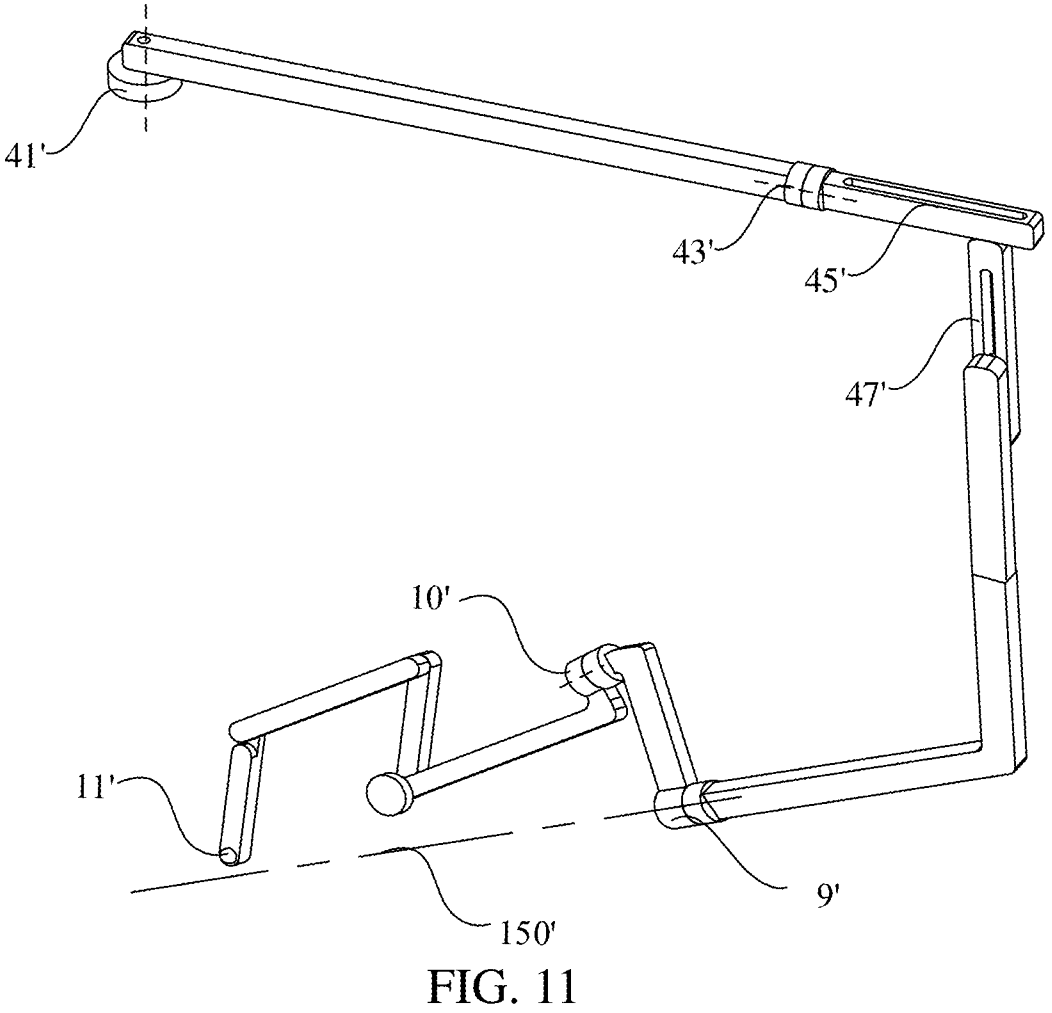
FIG. 11 is a simplified structural schematic view of a robotic arm according to still another embodiment of the present application.

As shown in FIG. 11, relative to the embodiments shown in FIGS. 7-8, in another embodiment, the adjustment arm may include two rotary joints 41', 43' and two linear joints 45', 47'. The rotary joints 41', 43' and the linear joints 45', 47' are linked, or alternatively, the rotary joint 43' and the linear joints 45', 47' are linked, so as to maintain the position of the RC point in the reference coordinate system of the orientation platform constant, in which, the rotation axes of the two rotary joints are perpendicular to each other, and the translation directions of the two linear joints are perpendicular. In addition, the present embodiment, when comparing with the embodiment shown in FIG. 10, the rotation axis of the rotary joint 43' and the rotation axis of the rotary joint 33' are perpendicular to each other.

Figure 12:
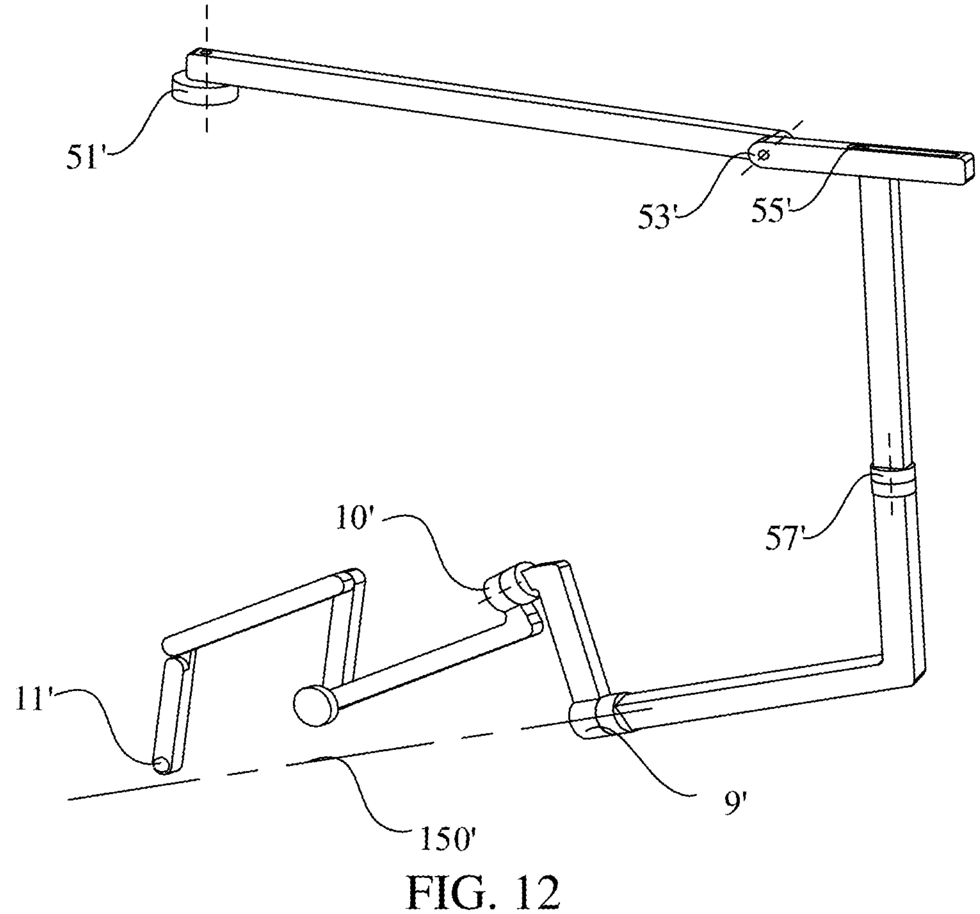
FIG. 12 is a simplified structural schematic view of a robotic arm according to still another embodiment of the present application.

As shown in FIG. 12, relative to the embodiments shown in FIGS. 7-8, in another embodiment, the adjustment arm may include three rotary joints 51', 53', and 57', and a linear joint 55'. The linear joint 55' is located between the rotary joint 53' and the rotary joint 57'. The rotary joints 51', 53', and 57' and the linear joint 57' are linked together, or alternatively, the rotary joints 53' and 57' and the linear joint 57' are linked together, so as to maintain the position of the RC point in the reference coordinate system of the directional platform constant, in which, the rotation axes of the rotary joint 5l' and the rotary joint 53' are perpendicular to each other, while the rotation axes of the rotary joint 57' and the rotary joint 51' are parallel.

Figure 13:
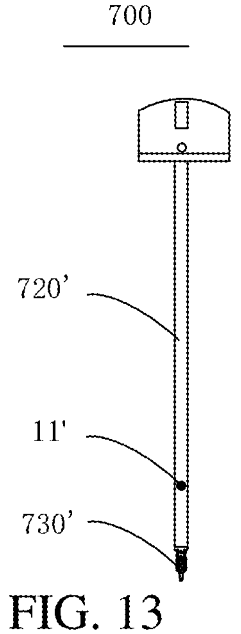
FIG. 13 is a structural schematic view of a surgical instrument of FIG. 5.

As shown in FIG. 13, the surgical instrument 700 has a long shaft 720' and an end effector 730' located at an end of the long shaft 720', and an RC point (remote center) is arranged near a side of the long shaft 720' near the end effector 730'. The RC point may also be referred to as an instrument fixed point 11'. The instrument fixed point 11' refers to that after the surgical instrument is installed on the instrument carrying arm 900 (FIG. 5) of the operating arm 130', a distal end of the long axis 720' of the surgical instrument remains at a position relatively fixed during the surgery. The cyclone axis 150' of the cyclone joint 9' does not pass through the instrument fixed point 11'. The instrument fixed point 11' coincides with the RC point of the surgical robot.

Before the surgery starts, an end of the instrument carrying arm 900 is dragged to a position close to the surgical site of the patient, and the rotary joint 1', the linear joint 3', the linear joint 5', and the rotary joint 7' are linked to compensate for the deviation of the instrument fixed point 11' which may be caused by the rotation of the cyclone joint 9, thereby keeping the instrument fixed point 11' coincide with the RC point. In other words, through the adjustment and compensation of the adjustment arm 126', the position of the RC point in the coordinate system of the orientation platform may be maintained constant.

In other embodiments, the linear joint 3', the linear joint 5', and the rotary joint 7' are linked, and the rotary joint 1' may not rotate, so as to compensate for the deviation of the instrument fixed point 11' that may be caused by the movement of the cyclone joint 9', and to maintain the position of the RC point in the coordinate system of the orientation platform constant, thereby avoiding tearing of the incision at a surgical instrument entrance.

According to the robot kinematics modeling method, such as a Denavit-Hartenberg (DH) method, the kinematics modeling of the orientation platform, the adjustment arm, and the instrument arm is performed, which includes the definition of the coordinate system and the definition of the coordinate transformation relationship. In the present application, transformation refers to the transformation of a transformation matrix or a coordinate system.

Combining with the coordinate transformation calculation and the kinematic calculation, the compensation movement of the adjustment arm during the adjustment of the movement of the cyclone joint is realized, and the kinematic calculation includes a forward solution calculation and an inverse solution calculation.

Figure 14:
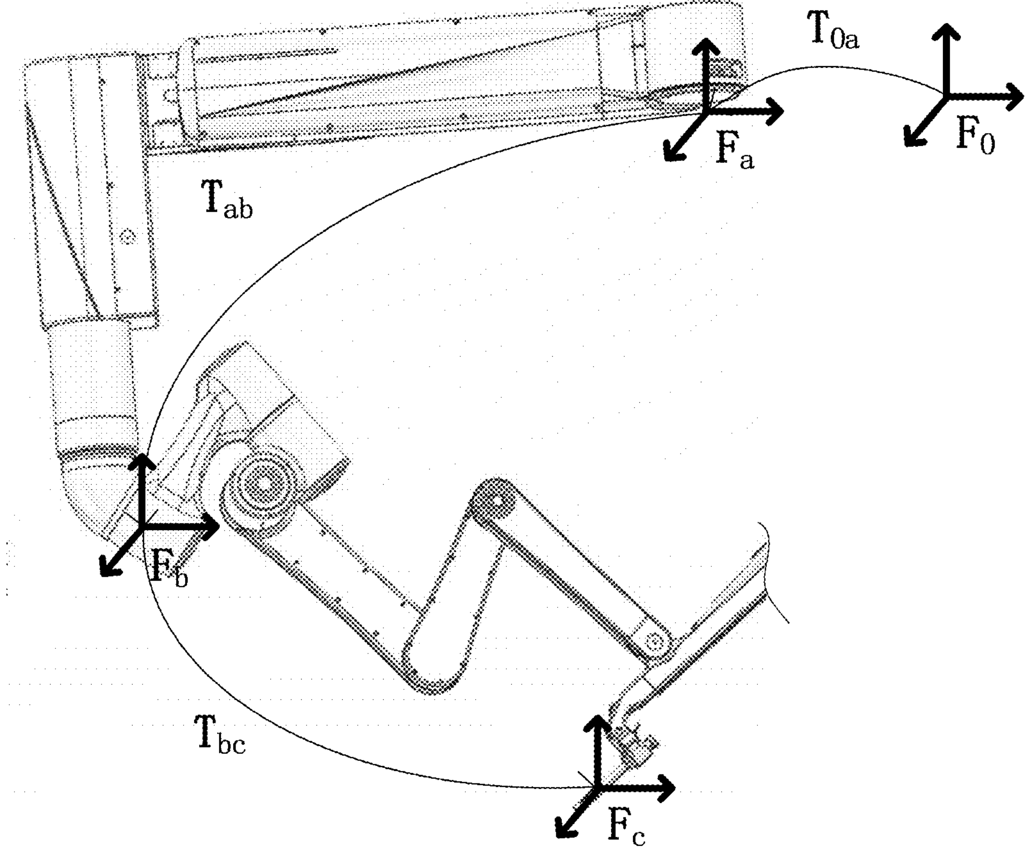
FIG. 14 is a structural schematic view of an operating arm and an adjusting arm of the present application.

As shown in FIG. 14, a reference coordinate system $F_0$ of an orientation platform, an adjustment arm coordinate system $F_a$, a cyclone joint coordinate system $F_b$, and an RC point coordinate system $F_c$ are defined.

The transformation from the reference coordinate system $F_0$ of the orientation platform to the adjustment arm coordinate system $F_a$ is a constant transformation Toa. The transformation from the adjustment arm coordinate system $F_a$ to the cyclone joint coordinate system $F_b$ is determined by positions of various joints of the adjustment arm and is defined as $T_{ab}$. The transformation from the cyclone joint coordinate system $F_b$ to the RC point coordinate system $F_c$ is determined by an angle value of the cyclone joint and is defined as $T_{bc}$.

When the user adjusts the cyclone joint, the cyclone joint performs motion adjustment according to the user input, and the adjustment arm joint performs compensation motion based on kinematic calculation, such that the position of the RC point in the coordinate system of the orientation platform remains constant.

Figure 15:
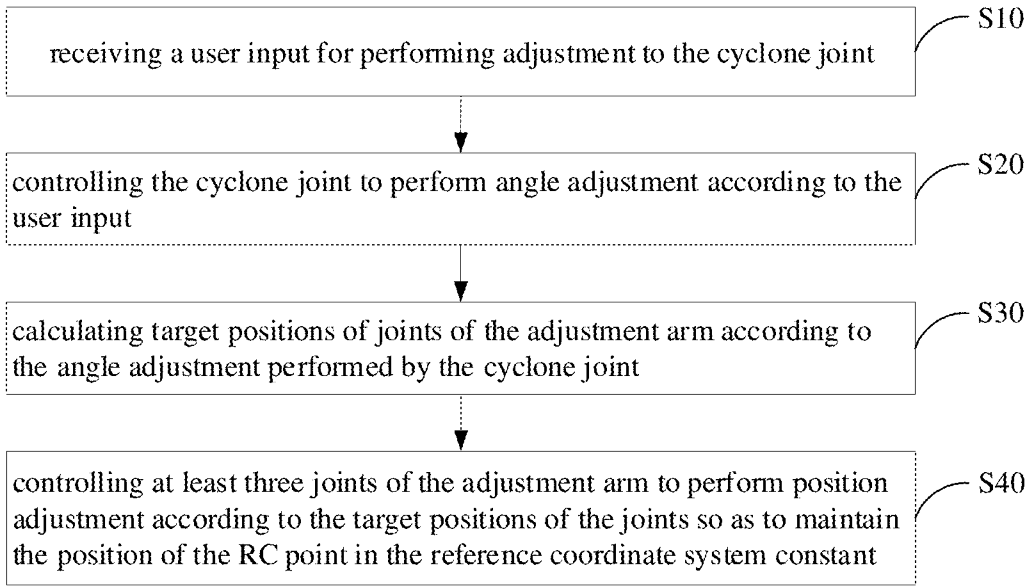
FIG. 15 is a schematic flow chart of a method for keeping a position of an RC point in a reference coordinate system ($F_0$) constant according to an embodiment of the application.

As shown in FIG. 15, in an embodiment, the present application provides a method for keeping a position of a remote center of manipulation (RC point) of a surgical robot constant in a reference coordinate system ($F_0$). The method is carried out by the following steps:

In step S10, a user input configured to perform the adjustment of the cyclone joint is received:

In this embodiment, buttons are correspondingly arranged on the operating arm, for example, button 1 and button 2 are arranged near a top of an instrument carrying arm 900. When the user clicks or presses the button 1, the operating arm will rotate clockwise around the cyclone axis, and when the user clicks or presses the button 2, the operating arm will rotate counterclockwise around the cyclone axis, in such condition, an angle of the cyclone joint will be adjusted.

In step S20, the cyclone joint is controlled to perform angle adjustment according to the user input:

In step S30, target positions of at least three joints of the adjustment arm are calculated according to the angle adjustment performed by the cyclone joint; and In step S40, the at least three joints of the adjustment arm are controlled to perform position adjustment according to the target positions of the at least three joints so as to maintain the position of the RC point in the reference coordinate system constant.

The details will be introduced below and will not be repeated here.

Figure 16:
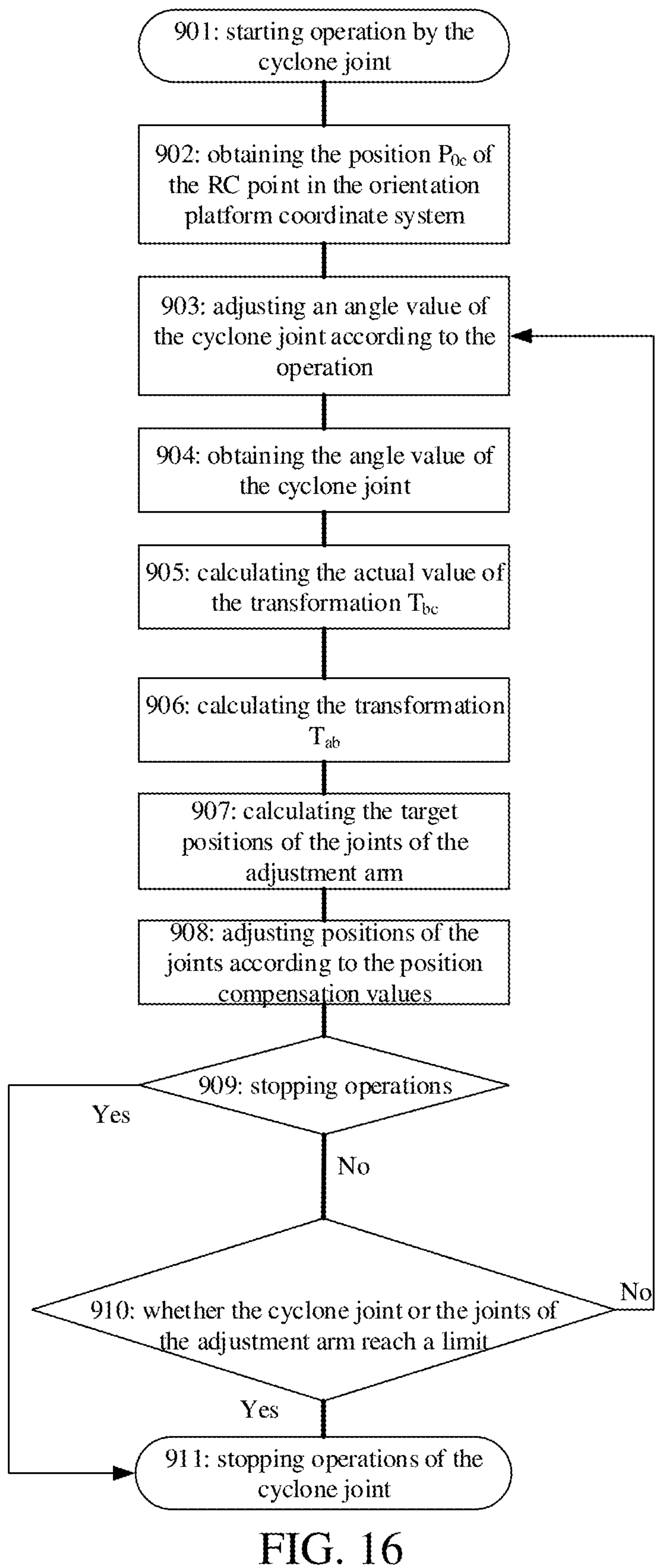
FIG. 16 is a schematic flow chart of an adjustment arm performing compensation movement according to an embodiment of the present application.

As shown in FIG. 16, the specific compensation method of the adjustment arm is performed as follows:

In step 901: the operation of the cyclone joint is started, in which, based on the user input, the processor responds to the user input and starts to execute the adjustment of the cyclone joint.

Herein, the processor may be a robotic arm processor.

In step 902: the position $P_{0c}$ of the RC point in the reference coordinate system is obtained.

Through the kinematics forward solution calculation, that is, through the coordinate transformation relationship, the transformation Toc from the reference coordinate system $F_0$ of the orientation platform to the RC point coordinate system $F_c$ is obtained:

$$T_{0c} = T_{0_a} * T_{ab} * T_{bc};$$

The transformation matrix can be expressed as $$T = \begin{bmatrix} R & P \\ 0 & 1 \end{bmatrix},$$

in which, R is an attitude component, and P is a position component.

The position component in this transformation is the position $P_{0c}$ of the RC point in the reference coordinate system, and the processor stores the position $P_{0c}$, and the purpose of the subsequent compensation method is to keep the position $P_{0c}$ constant.

In step 903: an angle value of the cyclone joint is adjusted according to the operation. Generally speaking, based on user input, the cyclone joint will perform angle adjustment according to a specific motion mode (such as JOG motion). The user input can be that the user presses the buttons for adjusting the cyclone join which are arranged on the operating arm.

In step 904: the angle value of the cyclone joint is obtained. The angle value of the cyclone joint can be obtained from the joint encoder. The joint encoder may be a position sensor, which is installed at the joint and can measure the angle value of the joint.

In step 905: the value of the transformation $T_{bc}$ is calculated. As mentioned above, the transformation from the cyclone joint coordinate system $F_b$ to the RC point coordinate system $F_c$ is determined by the angle value of the cyclone joint. Based on the angle value of the cyclone joint, an actual value of the transformation $T_{bc}$ may be obtained through a link transformation relationship.

The link transformation relationship in the present application is obtained through a general series DH modeling method. This term appears elsewhere in the present application will not be repeated again.

In step 906: the transformation $T_{ab}$ is calculated.

The above is to calculate the compensation value, and the method of constructing the compensation solution model is as follows:

The position component in $T_{0c}=T_{0a}*T_{ab}*T_{bc}$ is decomposed to get:

$$P_{0c} = R_{0a} * R_{ab} * P_{bc} + R_{0a} * P_{ab} + P_{0a}, \text{ in which,}$$

$P_{0c}$ represents a position component of a transformation $T_{0c}$: $R_{0a}$ represents an attitude component of the transformation Toa: Poa represents a position component of the transformation $T_{0a}$: $R_{ab}$ represents an attitude component of the transformation $T_{ab}$: $P_{ab}$ represents a position component of the transformation $T_{ab}$: $R_{bc}$ represents an attitude component of the transformation $T_{bc}$; and $P_{bc}$ represents a position component of the transformation $T_{bc}$.

$P_{0c}$ has been recorded as mentioned in the above. $R_{0a}$ and $P_{0a}$ represent the relative attitude and position between the reference coordinate system $F_0$ of the orientation platform and the adjustment arm coordinate system $F_a$, both of which are fixed parameters and are known. $R_{bc}$ and $P_{bc}$ represent the relative attitude and position between the cyclone joint coordinate system $F_b$ and RC point coordinate system $F_c$. In the adjustment process of the cyclone joint, only the angle value of the cyclone joint is a variable, which can be obtained from the previous step. It can be seen that in the above equation, only $R_{ab}$ and $P_{ab}$ are unknown variables, which are related to the positions of the joints of the adjustment arm.

When the above equation is expanded according to position components in the X-direction, the Y-direction, and the Z-direction, respectively, a compensation solution model comprising the following equation system are obtained:

$$\begin{cases} P_x = f_1(\theta_1, \theta_2 \ldots \theta_i) \\ P_y = f_2(\theta_1, \theta_2 \ldots \theta_i); \\ P_z = f_3(\theta_1, \theta_2 \ldots \theta_i) \end{cases}$$

in which, $P_x$, $P_y$, and $P_z$ are three components of the RC point position $P_{0c}$ in the X-direction, the Y-direction, and the Z-direction, respectively, and $f_1$, $f_2$, and $f_3$ represent corresponding calculation functions, which are all related to positions ($\theta_1$, $\theta_2$ . . . $\theta_i$) of the at least three joints of the adjustment arm.

In step 907: the target positions of the joints of the adjustment arm are calculated.

According to the solution model mentioned above, if the number of joints of the adjustment arm is 3, the target position ($\theta_1$, $\theta_2$ . . . $\theta_i$) of the adjustment arm can be obtained by solving the equation system; if the number of joints of the adjustment arm is greater than 3, the number of equations is smaller than the number of the solutions to be solved, which means that the corresponding adjustment arm has redundant joints, in such condition, a solution strategy needs to be defined.

Specifically, as shown in FIG. 8, the adjustment arm may have four joints, which are the first joint A, the second joint B, the third joint C, and the fourth joint D from top to bottom, respectively. For example, from top to bottom are a rotary joint A, a linear joint B, a linear joint C, and a rotary joint D.

After the cyclone joint moves, it is necessary to consider the movement compensation in the X-direction, the Y-direction, and the Z-direction. Combined with the structural characteristics, the optional compensation combinations of the adjustment arm include the following four combinations:

combination 1): A, B, and C: combination 2) A, C, and D; combination 3) B, C, and D; and combination 4) A, B, C, and D.

Explanation 1: if the combination involves joints A, B, and D, since these three joints are either horizontal rotation joints or horizontal translation joints, such combination cannot realize vertical compensation.

Explanation 2: if the combination is the combination 1) or combination 2) in the above four combinations, when the RC point coincides with or is close to an axis of the first rotary joint, the mobility of the rotary joint A in the combination 1) and the combination 2) is pathological or close-to-pathological, which specifically has the following performances: in a case where the RC point is close to coincide with the axis of the first rotary joint, the rotary joint A needs to move a large range in order to achieve the position compensation; and in a case where the RC point coincides with the axis of the first rotary joint, the rotary joint A fails and is unable to realize the compensation.

In the above steps, the term "mobility" refers to the feasibility and effectiveness of the robotic arm to adjust the movement of the end through the movements of the various joints. The term "pathological" refers to that in some states, the combined motion of the various joints of the robotic arm cannot achieve a desired movement of the end.

The term "close-to-pathological" refers to that the combined motion of various joints of the robotic arm requires a higher speed to meet the desired movement of the end. The specific performance is as described in the above.

The preferable compensation combination in the above four combinations are combination 3) or combination 4).

For the combination 3), as mentioned in the above, $\theta_1$ is a known variable, which represents a current position of the first rotary joint. In such condition, the compensation values ($\theta_2$, $\theta_3$, $\theta_4$) can be derived according to the above equation system.

For the combination 4), the joints are redundant, and a redundant strategy needs to be defined when solving the solutions.

The ideas of compensation combination of the adjustment arm are as follows: a. a main task of the movement of the adjustment arm is to compensate the deviation of the position of the RC point caused by the movement of the cyclone joint; and b. the spatial positioning of the four robotic arms are to be considered in order to avoid collisions during the operation.

Further, the first rotary joint can be defined as an active joint. When the cyclone joint adjusts the angle value according to the operation, the processor aims to adjust the angle between the first adjustment arm and the second adjustment arm, so as to enable the first joint A to move in the direction of the recommended angle; and the rest joints of the adjustment arm are derived according to the above equation system to obtain the corresponding compensation values ($\theta_2$, $\theta_3$, $\theta_4$).

Four robotic arms are arranged at the orientation platform, and the recommended angle refers to the angle between two adjustment arms. The angle between the first adjustment arm and the second adjustment arm refers to an angle between a connecting rod connecting any two adjacent joints on the first adjustment arm and a connecting rod connecting corresponding two adjacent joints on the second adjustment arm.

In step 908: positions of the joints of the adjustment arm are adjusted according to the position compensation values obtained from the above calculation.

In step 909: the cyclone joint stops operation.

In step 910: if the cyclone joint reaches a limit, or the joints of the adjustment arm reach a limit, step 911 is executed, which is as follows: the operation of the cyclone joint stops, and neither the cyclone joint nor the joints of the adjustment move. The limit is a software limit, that is, through the calculation, all joints can reach a state where none of the joints is able to continue to move.

If the cyclone joint and the adjustment arm do not reach the limit, step 903 is executed.

As described in the above embodiments, a method for keeping the position of the RC point of the surgical robot constant in the reference coordinate system during the movement of the cyclone joint is provided. Based on the mechanical structure and compensation algorithm, it can be ensured that the instrument fixed point coincides with the RC point during the preoperative preparation work, such that it can be ensured that the position of the RC point in the reference coordinate system remains constant during the surgery, no matter how the operating arm moves, and the operating arm will never touch the patient. By adjusting the spatial positioning of multiple operating arms, the problem of robotic arm collision during surgery is tackled.

Figure 17:
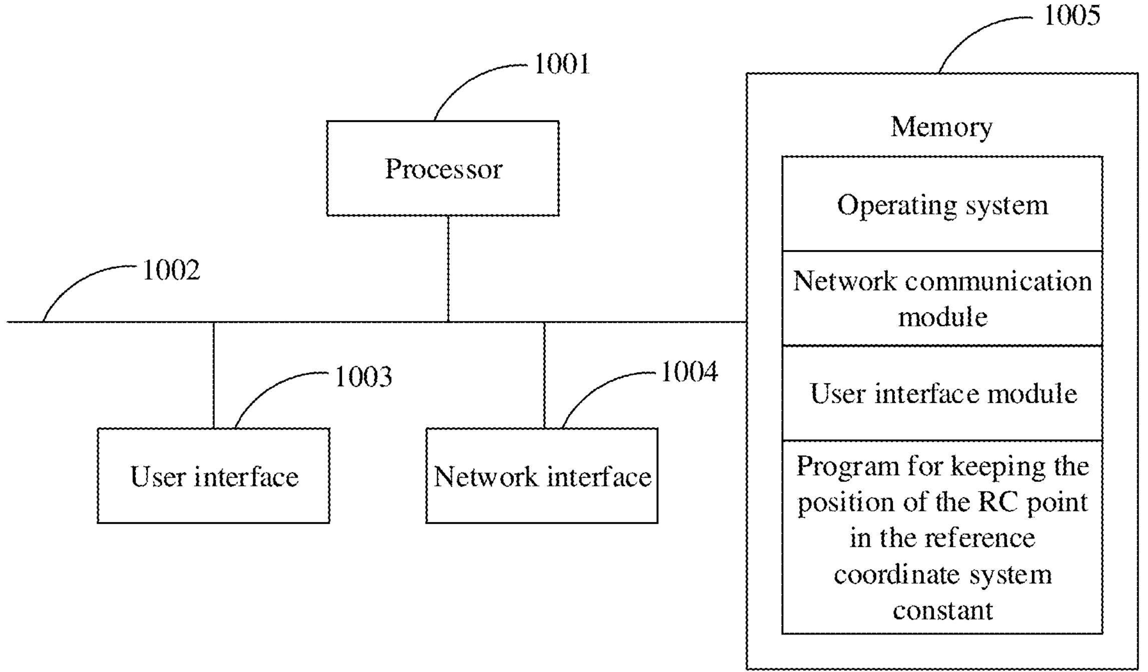
FIG. 17 is a schematic diagram of a hardware structure of a robotic arm, a slave operating device, or a surgical robot according to an embodiment of the present application.

As shown in FIG. 17, which is a schematic diagram of a hardware structure involved in a robotic arm, a slave operating device, or a surgical robot for keeping a position of an RC point in a reference coordinate system ($F_0$) constant according to the embodiments of the present application. The robotic arm is taken as an example for illustration hereinbelow.

The robotic arm may include: a processor 1001, such as a CPU, a communication bus 1002, a user interface 1003, a network interface 1004, and a memory 1005. The communication bus 1002 is configured to realize connection and communication among these components. The user interface 1003 may include: a display, and an input unit, such as a keyboard. The network interface 1004 may optionally include a standard wired interface and a wireless interface (such as WI-FI interface). The memory 1005 may be a high-speed RAM memory, or a stable memory (non-volatile memory), such as a disk memory. Optionally, the memory 1005 may also be a storage device independent of the processor 1001 as described in the above.

Those skilled in the art can understand that the hardware structure as shown in FIG. 17 does not constitute a limitation to the image processing apparatus, and may include more or less components than what is shown in the figure, or combine some components, or adopt different arrangements of the components.

As shown in FIG. 17, as a computer storage medium, a memory 1005 may include: an operating system, a network communication module, a user interface module, and a program for keeping the position of the RC point in the reference coordinate system ($F_0$) constant.

In the robotic arm shown in FIG. 17, the network communication module is mainly configured to connect to a server and perform data communication with the server; and the processor 1001 may be configured to: call the program for keeping the position of the RC point in the reference coordinate system constant, which is stored in the memory 1005, and to perform the following operations:

- receiving a user input for performing adjustment to the cyclone joint;
- controlling the cyclone joint to perform angle adjustment according to the user input;
- calculating target positions of joints of the adjustment arm according to the angle adjustment performed by the cyclone joint; and
- controlling the at least three joints of the adjustment arm to perform position adjustment according to the target positions of the joints so as to maintain the position of the RC point in the reference coordinate system constant.

Further, the processor 110 may be configured to call an image processing program of the endoscope stored in the memory 109, and to further perform the following operations:

- obtaining the position of the RC point in the reference coordinate system ($F_0$) and a constant transformation ($T_{0a}$) from the reference coordinate system ($F_0$) to an adjustment arm coordinate system ($F_a$);
- obtaining an angle value of the cyclone joint;
- calculating a first transformation ($T_{bc}$) from a cyclone joint coordinate system ($F_b$) to an RC point coordinate system ($F_c$) based on the angle value of the cyclone joint;
- calculating a second transformation ($T_{ab}$) from the adjustment arm coordinate system ($F_a$) to the cyclone joint coordinate system ($F_b$) based on the position of the RC point in the reference coordinate system ($F_0$), the constant transformation ($T_{0a}$), and the first transformation ($T_{bc}$); and
- calculating the target positions of the at least three joints of the adjustment arm based on the second transformation ($T_{ab}$).

Further, the processor 110 may be configured to call the image processing program of the endoscope stored in the memory 109, and to further perform the following operations:

- obtaining a third transformation ($T_{0c}$) from the reference coordinate system ($F_0$) to the RC point coordinate system ($F_c$) through a kinematic calculation; and
- acquiring the position of the RC point in the reference coordinate system ($F_0$) according to the third transformation ($T_{0c}$).

Further, the processor 110 may be configured to call the image processing program of the endoscope stored in the memory 109, and to further perform the following operations:

- obtaining the angle value of the cyclone joint from a joint encoder.

The joint encoder comprises a position sensor, and the position sensor is configured to measure an angle value of a joint where the joint encoder is located.

Further, the processor 110 may be configured to call the image processing program of the endoscope stored in the memory 109, and to further perform the following operations:

- determining the first transformation ($T_{bc}$) from the cyclone joint coordinate system ($F_b$) to the RC point coordinate system ($F_c$) based on the angle value of the cyclone joint.

Further, the processor 110 may be configured to call the image processing program of the endoscope stored in the memory 109, and to further perform the following operations:

- constructing a calculation model for the position of the RC point in the reference coordinate system ($F_0$) based on a coordinate transformation relationship; and
- expanding the calculation model along an X-direction, a Y-direction, and a Z-direction to obtain three equations.

The equations comprise a multivariate linear equation system, in which the target positions of the at least three joints of the adjustment arm are used as unknown variables.

Further, the processor 110 may be configured to call the image processing program of the endoscope stored in the memory 109, and to further perform the following operations:

$$P_{0c}=R_{0a}*R_{ab}*P_{bc}+R_{0a}*P_{ab}+P_{0a}, \text{ in which,}$$

$P_{0c}$ represents a position component of a transformation $T_{0c}$: $R_{0a}$ represents an attitude component of the transformation $T_{0a}$: $P_{0a}$ represents a position component of the transformation $T_{0a}$: $R_{ab}$ represents an attitude component of the transformation $T_{ab}$: $P_{ab}$ represents a position component of the transformation $T_{ab}$: $R_{bc}$ represents an attitude component of the transformation $T_{bc}$; and $P_{bc}$ represents a position component of the transformation $T_{bc}$.

Further, the processor 110 may be configured to call the image processing program of the endoscope stored in the memory 109, and to further perform the following operations:

- expanding equation $P_{0c}=R_{0a}*R_{ab}*P_{bc}+R_{0a}*P_{ab}+P_{0a}$ according to position components in the X-direction, the Y-direction, and the Z-direction, respectively, to obtain a compensation solution model comprising the following equation system:

$$\begin{cases} P_x = f_1(\theta_1, \theta_2 \ldots \theta_i) \\ P_y = f_2(\theta_1, \theta_2 \ldots \theta_i) \\ P_z = f_3(\theta_1, \theta_2 \ldots \theta_i) \end{cases};$$

in which, $P_x$, $P_y$, and $P_z$ are three components of the RC point position $P_{0c}$ in the X-direction, the Y-direction, and the Z-direction, respectively, and $f_1$, $f_2$, and $f_3$ represent corresponding calculation functions, which are all related to positions ($\theta_1, \theta_2 \ldots \theta_i$) of the at least three joints of the adjustment arm.

Further, the processor 110 may be configured to call the image processing program of the endoscope stored in the memory 109, and to further perform the following operations:

based on that a position $\theta_1$ of the first rotary joint is a constant, obtaining target positions ($\theta_2, \theta_3, \theta_4$) of the first linear joint, the second rotary joint, and the first linear joint according to the following compensation solution model:

$$\begin{cases} P_x = f_1(\theta_1, \theta_2, \theta_3, \theta_4) \\ P_y = f_2(\theta_1, \theta_2, \theta_3, \theta_4). \\ P_z = f_3(\theta_1, \theta_2, \theta_3, \theta_4) \end{cases}$$

The invention claimed is:

1. A robotic arm, being installed on an orientation platform, and comprising:

an adjustment arm, which is in connection with the orientation platform and comprises a plurality of joints;

a cyclone joint, which is in connection with the adjustment arm, wherein an axis passing through the cyclone joint is defined as a cyclone axis, and the cyclone axis does not pass through a remote center of manipulation (RC point);

a deflection joint, which is in connection with the cyclone joint, wherein an axis passing through the deflection joint is defined as a deflection axis, and the deflection axis passes through the RC point;

a parallelogram mechanism, which is in connection with the deflection joint and configured to move a surgical instrument around the RC point; and an instrument carrying arm, which is in connection with the parallelogram mechanism and configured to install the surgical instrument;

wherein in a state where the cyclone joint is actuated, at least three joints of the adjustment arm are linked to maintain a position of the RC point in a reference coordinate system of the orientation platform constant.

2. The robotic arm according to claim 1, wherein the plurality of joints comprise: a first joint, a second joint, a third joint, and a fourth joint connected in sequence; the first joint is in connection with the orientation platform; and the fourth joint is in connection with the cyclone joint.

3. The robotic arm according to claim 2, wherein the first joint and the fourth joint are rotary joints, and the second joint and the third joint are linear joints; and in the state where the cyclone joint is actuated, the first joint, the second joint, the third joint, and the fourth joint are linked to maintain the position of the RC point in the reference coordinate system constant.

4. The robotic arm according to claim 2, wherein the first joint and the fourth joint are rotary joints, and the second joint and the third joint are linear joints; and in the state where the cyclone joint is actuated, the second joint, the third joint, and the fourth joint are linked to maintain the position of the RC point in the reference coordinate system constant.

5. The robotic arm according to claim 2, wherein the first joint is a rotary joint, and the second joint, the third joint, and the fourth joint are linear joints; and in the state where the cyclone joint is actuated, the first joint, the second joint, the third joint, and the fourth joint are linked to maintain the position of the RC point in the reference coordinate system constant.

6. The robotic arm according to claim 2, wherein the first joint is a rotary joint, and the second joint, the third joint, and the fourth joint are linear joints; and in the state where the cyclone joint is actuated, the second joint, the third joint, and the fourth joint are linked to maintain the position of the RC point in the reference coordinate system constant.

7. The robotic arm according to claim 2, wherein the first joint and the second joint are rotary joints, and the third joint and the fourth joint are linear joints; and in the state where the cyclone joint is actuated, the first joint, the second joint, the third joint, and the fourth joint are linked to maintain the position of the RC point in the reference coordinate system constant.

8. The robotic arm according to claim 2, wherein the first joint and the second joint are rotary joints, and the third joint and the fourth joint are linear joints; and in the state where the cyclone joint is actuated, the second joint, the third joint, and the fourth joint are linked to maintain the position of the RC point in the reference coordinate system constant.

9. The robotic arm according to claim 2, wherein the first joint, the second joint, and the fourth joint are rotary joints, and the third joint is a linear joint; and in the state where the cyclone joint is actuated, the first joint, the second joint, the third joint, and the fourth joint are linked to maintain the position of the RC point in the reference coordinate system constant.

10. The robotic arm according to claim 2, wherein the first joint, the second joint, and the fourth joint are rotary joints, and the third joint is a linear joint; and in the state where the cyclone joint is actuated, the second joint, the third joint, and the fourth joint are linked to maintain the position of the RC point in the reference coordinate system constant.

11. A slave operating device, comprising an orientation platform, wherein the slave operating device further comprises the robotic arm according to claim 1, and the robotic arm is in connection with the orientation platform.

12. A surgical robot, comprising:

the slave operating device according to claim 11; and a master operating console, which is configured to control the slave operating device.

13. The slave operating device according to claim 11, comprising an orientation platform, wherein the plurality of joints comprise: a first joint, a second joint, a third joint, and a fourth joint connected in sequence; the first joint is in connection with the orientation platform; and the fourth joint is in connection with the cyclone joint.

14. The slave operating device according to claim 13, wherein the first joint and the fourth joint are rotary joints, and the second joint and the third joint are linear joints; and in the state where the cyclone joint is actuated, the first joint, the second joint, the third joint, and the fourth joint are linked to maintain the position of the RC point in the reference coordinate system constant.

15. The slave operating device according to claim 13, wherein the first joint and the fourth joint are rotary joints, and the second joint and the third joint are linear joints; and in the state where the cyclone joint is actuated, the second joint, the third joint, and the fourth joint are linked to maintain the position of the RC point in the reference coordinate system constant.

16. The slave operating device according to claim 13, wherein the first joint is a rotary joint, and the second joint, the third joint, and the fourth joint are linear joints; and in the state where the cyclone joint is actuated, the first joint, the second joint, the third joint, and the fourth joint are linked to maintain the position of the RC point in the reference coordinate system constant.

17. The slave operating device according to claim 13, wherein the first joint is a rotary joint, and the second joint, the third joint, and the fourth joint are linear joints; and in the state where the cyclone joint is actuated, the second joint, the third joint, and the fourth joint are linked to maintain the position of the RC point in the reference coordinate system constant.

18. The slave operating device according to claim 13, wherein the first joint and the second joint are rotary joints, and the third joint and the fourth joint are linear joints; and in the state where the cyclone joint is actuated, the first joint, the second joint, the third joint, and the fourth joint are linked to maintain the position of the RC point in the reference coordinate system constant.

19. The slave operating device according to claim 13, wherein the first joint and the second joint are rotary joints, and the third joint and the fourth joint are linear joints; and in the state where the cyclone joint is actuated, the second joint, the third joint, and the fourth joint are linked to maintain the position of the RC point in the reference coordinate system constant.

20. The slave operating device according to claim 13, wherein the first joint, the second joint, and the fourth joint are rotary joints, and the third joint is a linear joint; and in the state where the cyclone joint is actuated, the first joint, the second joint, the third joint, and the fourth joint are linked to maintain the position of the RC point in the reference coordinate system constant.

* * * * *